Dec. 13, 1927. 1,652,324
J. R. PHELPS
DATE RECORDING INSTRUMENT
Filed Sept. 15, 1926
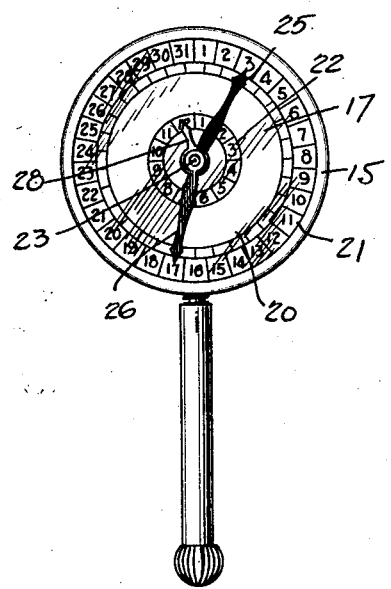
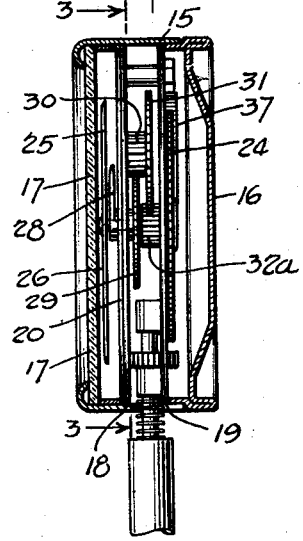
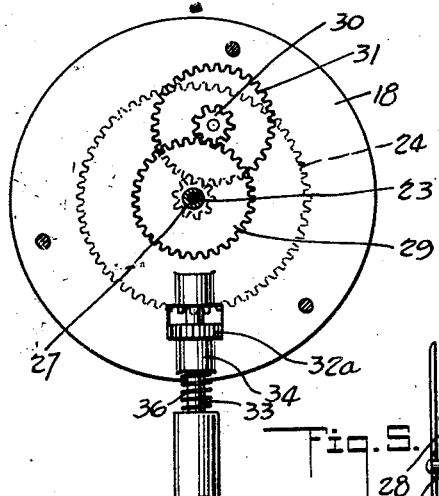
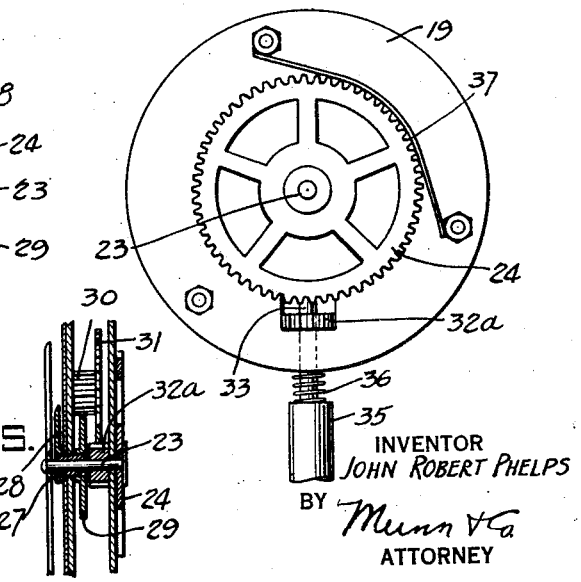
INVENTOR
JOHN ROBERT PHELPS
BY
ATTORNEY Patented Dec. 13, 1927.

1,652,324

UNITED STATES PATENT OFFICE.

JOHN ROBERT PHELPS, OF SAN BERNARDINO, CALIFORNIA.

DATE-RECORDING INSTRUMENT.

Application filed September 15, 1926. Serial No. 135,646.

My invention relates to and has for its purpose the provision of a simple and inexpensive instrument by which the date of performance of a certain operation or act is recorded and the date upon which such operation or act is to be repeated is indicated by and upon manipulating the instrument to record the first date. My invention is particularly adapted for use in connection with storage batteries to record the day and month upon which the battery was last tested and the date upon which the next testing should be made, whereby the failure to make battery tests at the required intervals is reduced to a minimum.

I will describe only one form of date recording instrument embodying my invention, and will then point out the novel features thereof in claims.

In the accompanying drawings,

Figure 1 is a view showing in front elevation one form of date recording instrument embodying my invention.

Figure 2 is an enlarged vertical sectional view of the instrument shown in Figure 1.

Figure 3 is a sectional view taken on the line 3—3 of Figure 2.

Figure 4 is a view showing the operating mechanism of the instrument in rear elevation and removed from the casing of the instrument.

Figure 5 is a fragmentary sectional view of the mechanism of the instrument showing the mounting of the indicating hands.

Similar reference characters refer to similar parts in each of the views.

Referring specifically to the drawings, my invention in its present embodiment comprises a casing made up of an annulus 15, back cover plate 16, and a front closure plate 17, preferably formed of glass. Within the annulus 15 is secured a pair of disks 18 and 19, the disk 19 having on its outer face a dial 20 graduated and numbered to form one scale 21 designating the days of any month, and another scale 22 designating the months of any year.

The disks 18 and 19 are secured in spaced parallel relation to each other and are designed for the purpose of supporting mechanism for operating indicating hands. This mechanism comprises an arbor 23 (Figure 5) extending through the disks and having fixed to its rear end a master gear 24. Fixed to its forward end and movable over the scale 21 are a pair of indicating hands 25 and 26, which are of different colors as illustrated in Figure 1 to facilitate distinguishing of the two. Rotatable on the arbor 23 is a tubular arbor 27 on the forward end of which is fixed an indicating hand 28 movable over the scale 22. Fixed to the rear end of the arbor is a gear 29 which continuously meshes with a pinion 30 to which latter is fixed a gear 31. The gear 31 meshes with a pinion 32ª fixed to the arbor 23.

As shown in Figure 4, the master gear 24 is adapted to be engaged by a pinion 32 fixed to a shaft 33 journaled in a sleeve 34. The outer end of the shaft carries an operating stem 35, and interposed between the stem and the sleeve 34 is an expansible spring 36 which functions to yieldably urge the shaft outwardly so that the pinion 32 is normally out of mesh with the master gear 24. It will be understood that by moving the stem 35 upwardly, the pinion 32 can be moved into mesh with the master gear, so that by rotating the stem the master gear will be rotated. In order to prevent accidental rotation of the master gear, it is yieldably restrained against movement by means of a spring 37 secured at its ends to certain of the bolts for connecting the disks 18 and 19, and bearing against the toothed edge of the gear.

In the operation of the instrument in its use in connection with storage batteries, the hand 25 can be moved over the dial by rotation of the stem 35 to indicate any day of a month, the particular month of the year being indicated on the scale 22 by the hand 28. It will be understood that through the medium of the train of gearing the indicating hand 28 is rotatable through rotation of the member 23 and hence may be operated by the stem 35. The gear ratio is such that the hand 28 moves the distance between any two graduations of the scale 22 while the hand 25 is describing one complete revolution on the scale 21.

With the hands 25 and 28 indicating the third day of the 12th month, respectively, as illustrated in Figure 1, the hand 26 being movable with but spaced from the hand 25 will indicate a date in advance of the date indicated by the hand 25. In actual practice the date upon which a storage battery is tested can be indicated by the hand 25, and simultaneously with the adjustment of the hand to indicate such date, the hand 26 is moved to indicate on the scale 21 an advanced date which in the present instance is 14 days. Upon this advanced date the battery is supposed to be again tested. Thus it will be seen that by adjusting the instrument to record the date of a battery test, the date upon which the battery should be again tested is automatically indicated.

Although I have herein shown and described only one form of date recording instrument embodying my invention, it is to be understood that various changes and modifications may be made herein without departing from the spirit of the invention and the spirit and scope of the appended claims.

I claim as my invention:

1. A date recording instrument adapted for use in connection with storage batteries comprising a dial graduated and numbered to form one scale designating the days of any month and another scale designating the months of any year, a pair of fixedly spaced hands movable over the first scale, a single hand movable over the second scale, and mechanism manually operable to move the pair of hands to indicate two different days and to simultaneously move the single hand to indicate the month of a year.

2. A date recording instrument adapted for use in connection with storage batteries comprising a dial graduated and numbered to form one scale designating the days of any month and another scale designating the months of any year, a pair of fixedly spaced hands movable over the first scale, a single hand movable over the second scale, and mechanism manually operable to move the pair of hands to indicate two different days and to simultaneously move the single hand to indicate the month of a year, said mechanism including a train of gearing and an operating stem normally urged out of operative engagement with the train of gearing.

3. A date recording instrument adapted for use in connection with storage batteries comprising a dial graduated and numbered to form one scale designating the days of any month and another scale designating the months of any year, a pair of fixedly spaced hands movable over the first scale, a single hand movable over the second scale, and mechanism manually operable to move the pair of hands to indicate two different days and to simultaneously move the single hand to indicate the month of a year, said mechanism including an arbor to which the pair of hands are secured, a master gear fixed to the arbor, a pinion fixed to the arbor, a tubular arbor rotatable on the first arbor and to which the single hand is secured, a gear fixed to the tubular arbor, a gear meshing with the pinion, a pinion fixed to the last gear and meshing with the second gear, and an operating stem having a pinion yieldably urged out of mesh with the master gear but movable into mesh therewith and rotatable by the stem to actuate the master gear.

4. A date recording instrument adapted for use in connection with storage batteries comprising a casing, a pair of discs in the casing, threaded studs having nuts and securing the plates together in spaced parallel relation, one of the disks having on its outer face a dial graduated and numbered to form one scale designating the days of any month and another scale designating the months of any year, a pair of fixedly spaced hands movable over the first scale, a single hand movable over the second scale, mechanism manually operable to move the pair of hands to indicate two different days and to simultaneously move the single hand to indicate the month of a year, said mechanism comprising an arbor journaled in the disks and to which the pair of hands are secured, a master gear fixed to the arbor, a pinion fixed to the arbor, a tubular arbor rotatable on the first arbor and to which the single hand is secured, a gear fixed to the tubular arbor, a gear meshing with said pinion, a pinion fixed to the last mentioned gear and meshing with the second said gear, an operating stem having a pinion yieldably urged out of mesh with the master gear but movable into mesh therewith and rotatable by the stem to actuate the master gear, and means for restraining the master gear against accidental rotation comprising a curved flat spring bearing against the periphery of the gear and having perforated ears receiving certain of the disk securing bolts so as to be secured to the disks.

JOHN ROBERT PHELPS.